Oct. 24, 1944.  H. C. KRONE ET AL  2,361,214
COMBINED SWING JOINT AND FLOW CONTROL VALVE
MEANS FOR LIQUID LOADING CONDUIT SYSTEMS
Filed March 23, 1943  2 Sheets-Sheet 1
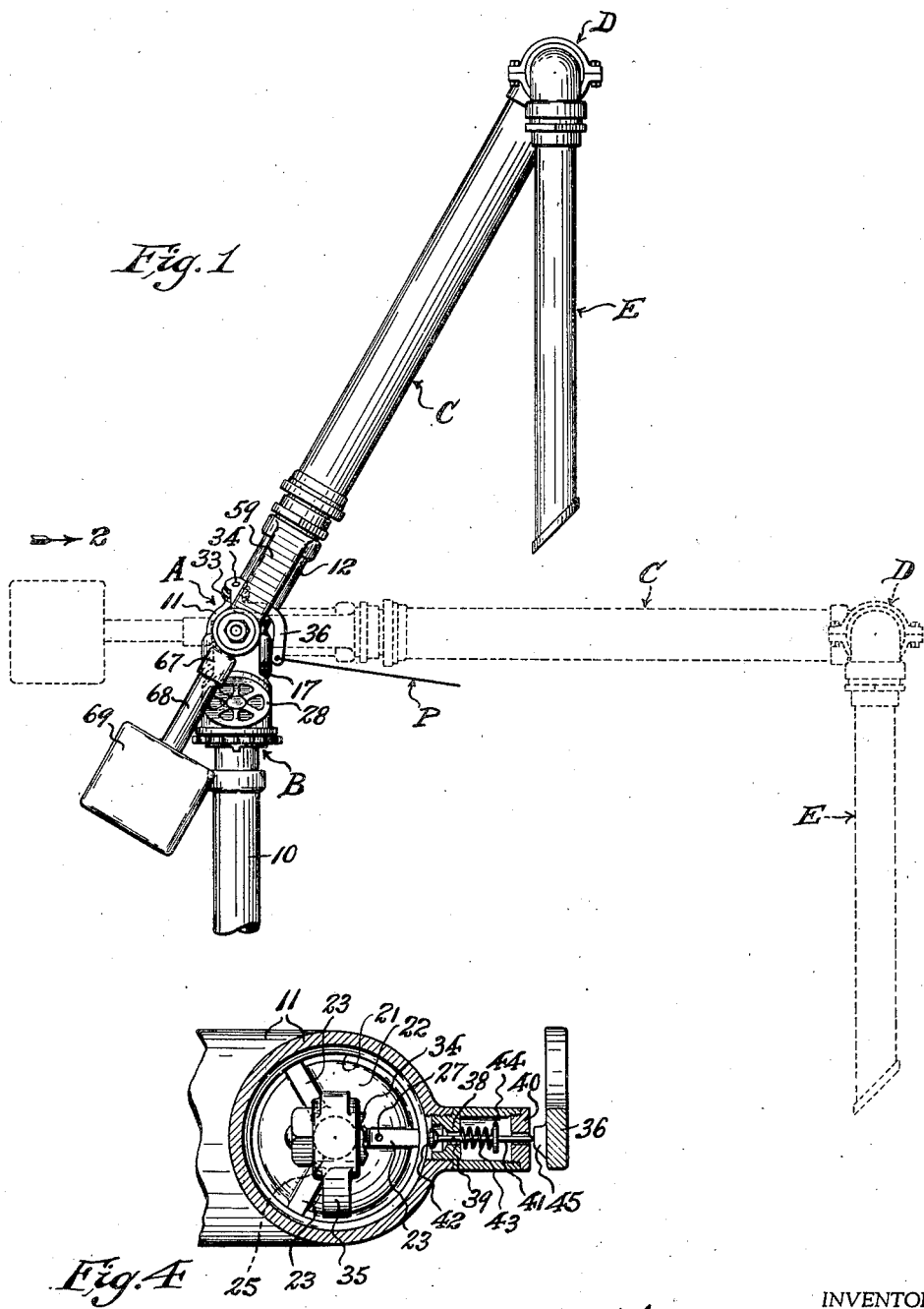

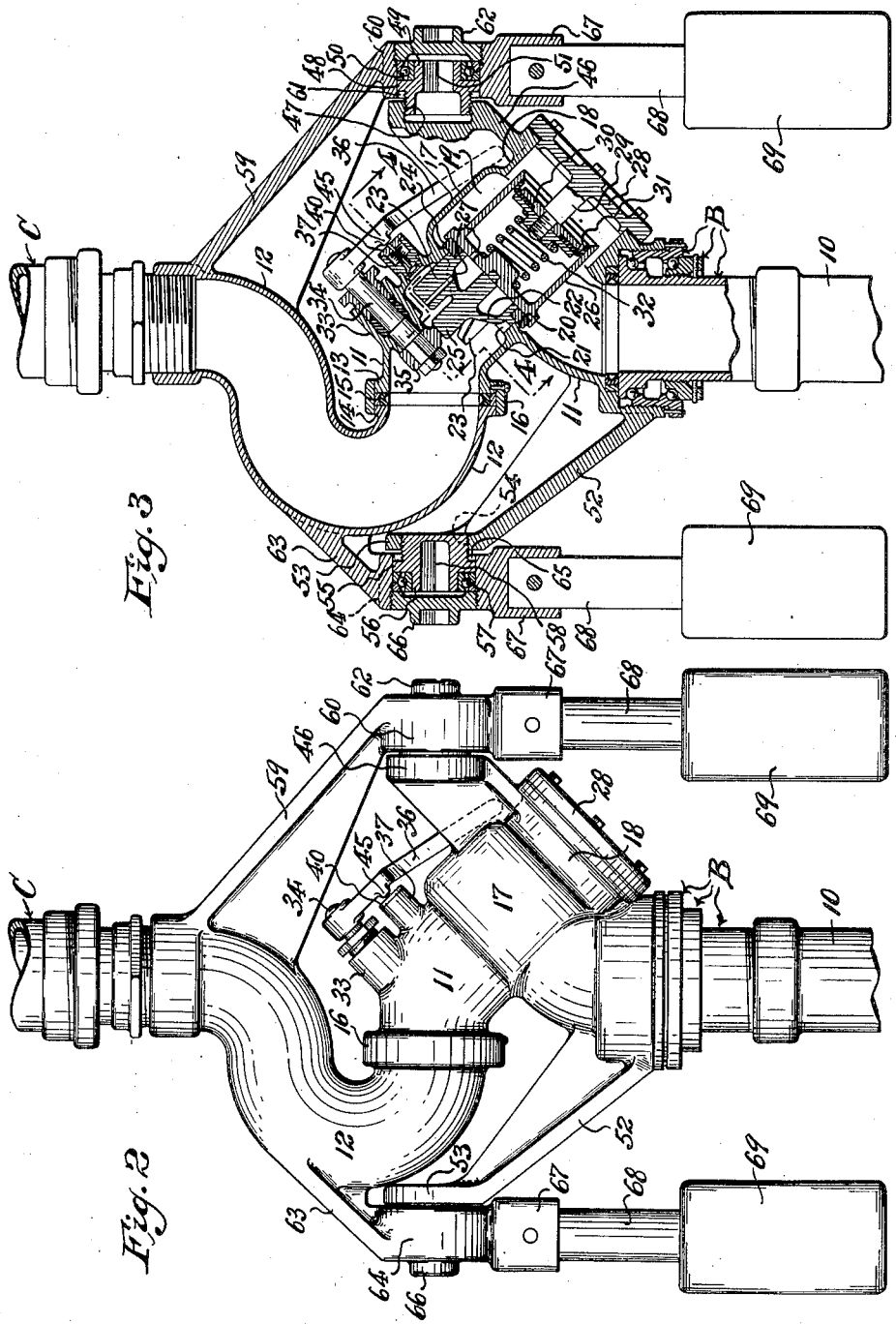

Patented Oct. 24, 1944

2,361,214

UNITED STATES PATENT OFFICE 2,361,214

COMBINED SWING JOINT AND FLOW CONTROL VALVE MEANS FOR LIQUID LOADING CONDUIT SYSTEMS

Howard C. Krone, River Edge, and William Meyer, East Orange, N. J., assignors to Wheaton Brass Works, Newark, N. J., a corporation of New Jersey Application March 23, 1943, Serial No. 480,170

11 Claims. (Cl. 137—69)

This invention relates to improvements in loading conduit systems for delivering liquids from supply sources, by either gravity or pump pressure, into containers, and especially for loading oil, gasoline and other liquids into tank trucks, railroad tank cars or other containers in which such liquids are transported or shipped; and the invention has reference, more particularly, to improved universal swing connections, including a novel combined counterbalanced swing joint and flow control or loading valve means for connection with and support of the loading arm or discharge means of the system, whereby the latter may be raised and lowered and angularly adjusted to quickly and easily dispose the same in and out of service position.

This invention has for an object to provide a novel counterbalanced swing joint construction comprising a relatively stationary part including a built-in manipulatable flow control or loading valve means arranged between its receiving and discharge ends, and a relatively swingable part in communicating, leak-proof sealed, pivotal connection with the discharge end of said first mentioned part, so as to swing up and down about a horizontal axis, and to the discharge end of which is communicatingly connected a loading arm or discharge means, adapted to be raised and lowered by such swinging movements thereof.

Another object of this invention is to provide a novel combined counterbalanced swing joint and flow control or loading valve means for loading conduit systems, wherein said valve means is of the self-closing, automatic vacuum breaker type.

Other objects of this invention, not at this time more particularly enumerated, will be understood from the following detailed description of the same.

An illustrative embodiment of this invention is shown in the accompanying drawings, in which—

Fig. 1 is a side elevational view of a loading conduit system provided with the novel combined counterbalanced swing joint and flow control or loading valve means according to this invention.

Fig. 2 is a fragmentary elevational view of the combined counterbalanced swing joint and flow control or loading valve means, viewed in the direction of the arrow 2 in Fig. 1, but drawn on an enlarged scale; Fig. 3 is a transverse sectional view of the same; and Fig. 4 is a fragmentary horizontal section, taken on line 4—4 in Fig. 3, but drawn on a further enlarged scale.

Similar characters of reference are employed in the above described views, to indicate corresponding parts.

In the drawings, the reference character 10 indicates the stand pipe of a loading conduit system which leads from a source of liquid to be delivered, as, e. g., from a storage tank (not shown) for gasoline, oil or other liquid. The liquid may be delivered to and through the stand pipe 10 by gravity or by pump pressure according to the type of tank and its location relative to the stand pipe.

Connected to communicate with the stand pipe, so as to receive flow therethrough of liquid to be delivered, is an articulated loading conduit system comprising a counterbalanced combined swing joint and flow control or loading valve structure A, the receiving end of which is connected to said stand pipe 10 by a swivel joint B, and to the discharge end of which is connected, for extension therefrom, a telescopically extensible delivery pipe arm C, to the outer end of which is connected, by a suitable articulating joint D, a drop or discharge pipe member E. The counterbalanced combined swing joint and flow control or loading valve structure A is adapted to permit the delivery pipe arm C to swing up and down in vertical plane about a horizontal axis, while the swivel joint B permits the combined swing joint and valve structure A, together with the delivery pipe arm C and its drop or discharge pipe member E, to swing in horizontal plane about a vertical axis, thus permitting universal movement of the delivery pipe arm C and its drop or discharge pipe member E. The relatively movable part of the combined swing joint and valve structure A, from which the delivery pipe arm C and its drop or discharge pipe member E extends, is counterbalanced by weight for up-swing to a substantially upstanding or other raised out of service position, as shown by full line representation of these parts in Fig. 1, while nevertheless being yieldable to down-swinging movement to a service position, as shown by broken line representation thereof in Fig. 1. The articulating joint connection D between the delivery pipe arm C and the drop or discharge pipe member E, allows the latter to fold back relative to the former when the former is up-swung to out of service position, as shown by full lines in Fig. 1, but to maintain under gravity, a perpendicular position when the delivery pipe arm is down-swung to service position, as shown by broken lines in Fig. 1. Owing to the universal swinging movement to which the delivery pipe arm C may be subjected, and to the telescopic extensibility of the same, there is no necessity for meticulous care to be exercised in spotting a tank truck, railroad tank car or other container in position to be filled, since the drop or discharge pipe member E may be readily and quickly adjusted and brought into position to enter the filling opening of the tank truck, railroad tank car or other container to be filled.

According to this invention, the counterbalanced swing joint structure includes in built-in combination therewith as an unitary part thereof a flow control or loading valve means, thereby providing a very compact and less expensive construction, while at the same time reducing to a minimum the combined weight of the movable part of the swing joint and delivery and drop pipe portions extending therefrom, and thereby requiring therefore less counterbalancing weight, so that operative movement of these parts to service position is more easily and quickly obtained, by exercise of considerably less physical force. Another advantage of such combined relation of swing joint and built-in flow control or loading valve means is that the number of coupling joints required in the conduit system as a whole is reduced to a minimum, and points of possible leakage are consequently likewise reduced.

The novel combined counterbalance swing joint and flow control or loading valve structure, according to this invention, comprises reversely curved tubular intake and outlet joint members 11 and 12, having their outer ends in alignment with the longitudinal axis of the joint structure as a whole, and their opposed inner ends in alignment with the horizontal axis of the joint structure as a whole. The opposed inner ends of said joint members 11 and 12 are respectively provided with annular terminal flanges 13 and 14, between the opposed faces of which is engaged a suitable anti-leak packing means 15, which is held against outward displacement by an annular retaining collar 16 suitably affixed to the external periphery of one of said terminal flanges, e. g., the flange 13, and consequently in such manner as not to impede packing compressive movements of said flanges 13 and 14 one toward the other.

In the swing joint structure thus provided, the intake joint member 11 constitutes a relatively stationary joint member and the outlet joint member provides a relatively movable joint member. Provided in connection with said relatively stationary joint member 11, as a built-in unitary part thereof, is a flow control or loading valve means. To this end, said joint member 11 is provided at its elbow portion, and thus intermediate its ends, with an annular enlarged valve casing portion 17 and an outwardly extending endwise open extension 18 thereof of somewhat reduced diameter, which, together, provide a valve chamber 19. The axis of the valve chamber thus formed is preferably disposed at a downward angle of approximately forty-five degrees relative to the transverse axis of the joint structure. Formed in connection with the valve casing portion 17, at and within the upper end of the valve chamber 19, is a transverse wall formed to provide an annular valve seat portion 20, which surrounds a valve port 21. Cooperative with said valve seat portion 20 and valve port 21 is a valve member 22 having radial guide elements 23 slidably engaging the periphery of said valve port 21, so as to guide the movements of said valve member as it opens and closes. Said valve member 22 carries an annular valve seal member 24 to cooperate with the valve seat portion 20. Said valve member 22 is also provided with an upwardly projecting axial thrust stud 25, for purposes subsequently to be referred to. Connected with the underside of the valve member 22, for downward axial extension therefrom into the valve chamber 19, is a valve check cylinder 26 having a closed upper end and an open bottom end. Small ports or vents 27 provided in the valve member 22 and valve check cylinder end wall afford limited communication between the interior of said valve check cylinder and the discharge end portion of the joint member 11. The external open end of the extension 18 of the valve chamber is closed by a removable cap plate 28. Projecting axially from the interior side of said cap plate 28 is a piston post 29, to the free end of which is affixed a piston structure 30, which includes a resilient cup washer 31. This piston structure 30 enters the open end of the valve check cylinder 26, the wall surfaces of which slidably engage the flange of said resilient cup washer 31 with well-known sealing effect. As will be understood, the valve check cylinder 26 is movably related to the thus stationarily supported piston structure 30. A compression spring means 32 is engaged between the stationary piston structure and the inner end of the valve check cylinder 26, whereby to yieldably thrust the latter and the valve member associated therewith to normal valve port closing position, so that the valve is of the self-closing type.

The joint member 11, at a point in its outward side intermediate the valve casing portion 17 and its discharge end, is provided with an angularly and externally projecting stuffing box means 33, in which is journaled a rotatable spindle 34. Affixed to the internal end of said spindle, so as to be rotated thereby, is a valve actuating cam 35, which operatively engages the extremity of the heretofore described valve thrust stud 25. Affixed to the external end of said spindle 34 is an actuating lever arm 36.

The joint member 11, at a point in its outward side intermediate the valve casing portion 17 and said stuffing box means 33, is further provided with a vacuum breaker valve housing 37, which is disposed beneath and parallel to said stuffing box means 33. Said valve housing 37 is provided within its inner end portion with a transverse partition 38 having a centrally disposed valve port 39. The outer end of said valve housing 37 is closed by a detachable closure cap 40. Slidably extending through said valve port 39 and through said closure cap 40 is the stem 41 of an inwardly opening valve disc 42 which operates to open and close the valve port 39, being urged to valve port closing position by a compression spring 43 arranged between the partition 38 and spring engaging means 44 with which the valve stem 41 is provided (see Fig. 4 more particularly). The heretofore described main valve actuating lever arm 36 is provided with a lateral cam projection 45 on its inner side, which engages and thrusts inwardly the valve stem 41, when said lever arm occupies normal in-swung position to permit closing of the main valve, thereby thrusting inwardly the valve disc 42 so as to open the valve port 39, and thus open the interior of the joint member 11, beyond the closed main valve, to communication with the atmosphere, and thus to prevent occurrence of vacuum conditions in the loading system conduits beyond the closed main valve, and consequently to thus prevent impedance of draining discharge of liquid through such portions of the loading system conduits after the main valve is closed.

Extending directly from one side of the stationary joint member 11, and preferably springing from the valve casing portion 17 thereof, is a trunnion supporting arm 46, provided in its extremity with an internally screw-threaded opening 47 axially aligned with the horizontal axis of the joint structure as a whole. Supported by its externally screw-threaded butt, which is screwed into said opening 47 of the trunnion supporting arm 46, is an outwardly projecting trunnion member 48. Said trunnion member 48 is provided with an outer end portion 49 of reduced diameter, mounted upon which, so as to be stopped against the shoulder at the juncture thereof with the main body of said trunnion member, is a ball-bearing or like anti-friction bearing means 50. Said trunnion member 48 is provided with an axial opening 51 of square or other polygonal cross-sectional shape, which is adapted to receive a correspondingly shaped wrench means, whereby said trunnion member and the anti-friction bearing means carried thereby may be assembled with and suitably adjusted relative to the trunnion supporting arm 46.

Offset by a carrying bracket arm 52, which extends outwardly and upwardly from the opposite side and lower end portion of the stationary joint member 11, is a second trunnion support 53 also disposed in axial alignment with the horizontal axis of the joint structure as a whole. Said trunnion support 53 is also provided with an internally screw-threaded opening 54. Supported by its externally screw-threaded butt, which is screwed into said opening 54, is an outwardly projecting trunnion member 55. Said trunnion member 55 is also provided with an outer end portion 56 of reduced diameter, mounted upon which, so as to be stopped against the shoulder at the juncture thereof with the main body of said trunnion member, is a ball-bearing or like anti-friction bearing means 57. Said trunnion member 55 is provided with an axial opening 58 of square or other polygonal cross-sectional shape, which is adapted to receive a correspondingly shaped wrench means, whereby said trunnion member 55 and its anti-friction bearing means may be assembled with and suitably adjusted relative to the trunnion support 53.

Offset by a carrying bracket arm 59, which extends outwardly and downwardly from one side of the movable joint member 12, is a hub member 60 having a bearing opening 61 to receive the trunnion member 48 and its associated anti-friction bearing means 50. The outer part of said bearing opening 61 is internally screw-threaded, and screwed thereinto is an adjusting nut 62, which is adapted to thrustingly bear against the outer end of the trunnion member 48 and interposed anti-friction bearing means 50. In like manner, offset by a similar carrying bracket arm 63, which extends outwardly and downwardly from the opposite side of the movable joint member 12, is a second hub member 64 having a bearing opening 65 to receive the opposite trunnion member 55 and its associated anti-friction bearing means 57. The outer part of said second hub member 64 is likewise internally screw-threaded, and screwed thereinto is an adjusting nut 66, which is adapted to thrustingly bear against the outer end of the trunnion member 55 and interposed anti-friction bearing means 57.

It will be observed that the trunnion and hub connections thus aligned with the horizontal axis of the swing joint structure as a whole, establish a pivotal support for the movable joint member 12, whereby the same may swing in vertical plane about such horizontal axis relative to the stationary joint member 11 and its unitarily included built-in loading valve means, and so that the inner end of the movable joint member 12 turns upon and relative to the inner end of the stationary joint member 11 and to the interposed anti-leak packing means 15.

In order to obtain compression of the anti-leak packing means 15, so as to assure a tight leak-proof joint between the opposed inner ends of the movable and stationary joint members, it is merely necessary to back off the adjusting nut 66 and turn in the adjusting nut 62, whereby to exert an inward thrust upon the trunnion structure of the stationary joint member 11 and an opposite or outward thrust upon the hub structure of the movable joint member 12, with the result that the opposed inner ends of said joint members are urged one toward the other, with suitable compressive sealing effect upon the interposed packing means 15; whereafter the adjusting nut 66 is screwed home so as to stabilize such condition.

Extending from each hub member 60 and 64, in a direction perpendicular to the horizontal axis of the joint structure as a whole, are socketed elements 67 in which are affixed the ends of extending carrier arms 68. Mounted on said carrier arms 68, preferably in a manner so that the same may be adjustably affixed thereto in desired balancing position, are counterbalance weights 69, which, under gravity, function to swing up and yieldably hold the movable joint member 12, and the delivery pipe arm C and discharge pipe arm E carried thereby, in up-raised out of service position.

The lower or receiving end of the stationary member 11 is provided with a swivel joint means B for so connecting the swing joint structure and associated parts to the stand pipe 10 as to permit the structure to be revolved about its longitudinal or vertical axis, thus providing for universal movement of the liquid discharge means which extends therefrom.

In the use of the loading conduit system, the operator swings down, and laterally as required, the delivery pipe arm C so as to insert the drop or discharge pipe member E in the filling opening of the tank truck, railroad tank car or other container into which the served liquid is to be discharged. After this is done, the flow control or loading valve is opened by swinging outward the actuating lever arm 36, from which may extend, to a conveniently accessible point, a pull cable P by which operative motion may be imparted to said lever arm. As the lever arm 36 swings outwardly, the cam projection 45 thereof is first moved away and out of engagement with the stem 41 of the vacuum breaker valve means, the valve disc 42 of which is thereupon moved to closed relation to the port 39. As the movement of the lever arm 36 continues with attendant continued rotation of the spindle 34 and cam 35, the latter thrusts downwardly upon the thrust stud 25 of the loading valve member 22, thereby opening the valve port 21 to the outward flow of liquid therethrough, while at the same time the valve check cylinder 26 moves toward the piston structure 30, thus driving any fluid trapped in the former outwardly through the vents 27. The loading valve being thus opened, is so held by the pull of the cable P until the latter is released upon completion of delivery to the required amount of the liquid being served. When the cable P is released, the lever arm 36, under gravity, or by equivalent spring tension if desired, swings inward or back to normal initial position, thus releasing the thrust of the cam 35 upon the valve member. Thereupon the stored tension of the compression spring 32 moves the valve member 22 and its check cylinder 26 back to valve port closing position. This self-closing movement of the valve member is suitably retarded by the limited influx of fluid through the vents 27 into the check cylinder interior. As the lever arm 36 resumes normal initial position, its cam projection 45 again engages and thrusts inwardly the vacuum breaker valve stem 41 to move the valve disc 42 to open position, so that communication between the interior of the loading conduit system, beyond the valve port 21 and valve member 22, and the atmosphere is established, thus preventing internal vacuum conditions and thereby assuring quick draining discharge of all remaining liquid through the outwardly extending passages of the system.

It will be understood that various changes could be made in the construction and arrangements of combined swing joint and loading valve structure above described, without departing from the scope of this invention as defined by the following claims. It is therefore intended that all matter contained in the above description or shown in the accompanying drawings shall be interpreted as illustrative and not in a limiting sense.

We claim:

1. In a fluid conduit system, a pair of reversely curved tubular joint members having their outer ends in longitudinal alignment and their opposed inner ends cooperatively engaged and aligned on a tranverse axis, one of said members constituting a relatively stationary joint member and the other a relatively movable joint member, said joint members having cooperative externally offset means for pivotally relating the same whereby the movable joint member may swing about said transverse axis, the elbow portion of said stationary joint member being formed to provide a valve casing portion, the axis of which is angular to the aforesaid transverse axis of the joint members, said valve casing including a wall having a valve port across the passage of said stationary joint member, a spring closed valve member to normally close said valve port against the flow of fluid through said joint members, a valve member actuating cam having a spindle journaled in and through the wall of said stationary joint member, and a cam actuating lever arm on the external end of said spindle.

2. In a fluid conduit system, a pair of reversely curved tubular joint members having their outer ends in longitudinal alignment and their opposed inner ends cooperatively engaged and aligned on a transverse axis, one of said members constituting a relatively stationary joint member and the other a relatively movable joint member, said joint members having cooperative externally offset means for pivotally relating the same whereby the movable joint member may swing about said transverse axis, the elbow portion of said stationary joint member being formed to provide a valve casing portion, the axis of which is angular to the aforesaid transverse axis of the joint members, said valve casing including a wall having a valve port across the passage of said stationary joint member, a spring closed valve member to normally close said valve port against the flow of fluid through said joint members, a valve member actuating cam having a spindle journaled in and through the wall of said stationary joint member, a cam actuating lever arm on the external end of said spindle, a vacuum breaker valve means opening through the wall of said stationary joint member beyond the aforesaid valve member, and means carried by said lever arm adapted to open said vacuum breaker valve means when said lever arm and said cam controlled thereby occupy normal initial positions disposing said valve member in valve port closing position.

3. In a fluid conduit system, a pair of reversely curved tubular joint members having their outer ends in longitudinal alignment and their opposed inner ends cooperatively engaged and aligned on a transverse axis, one of said members constituting a relatively stationary joint member and the other a relatively movable joint member, said joint members having cooperative means for pivotally relating the same whereby the movable joint member may swing about said transverse axis, said stationary joint member having a wall provided with a valve port across its passage, movable main valve means to normally close said valve port against the flow of fluid through said joint members, operating means for said main valve means, means exteriorly of said stationary joint member for actuating said operating means, a vacuum breaker valve means opening through the wall of said stationary joint member beyond said main valve means, and means carried by said exterior actuating means adapted to open said vacuum breaker valve means when said actuating means occupies normal initial position disposing said main valve means in valve port closing position.

4. In a fluid conduit system, a pair of reversely curved tubular joint members having their outer ends in longitudinal alignment and their opposed inner ends cooperatively engaged and aligned on a transverse axis, one of said members constituting a relatively stationary joint member and the other a relatively movable joint member, said joint members having cooperative means for pivotally relating the same whereby the movable joint member may swing about said transverse axis, means to bias said movable joint member to an up-swung normal position, said stationary joint member having a wall provided with a valve port across its passage, movable flow control valve means to normally close said valve port against the flow of fluid through said joint members, operating means for said valve means, means exteriorly of said stationary joint member for actuating said operating means, a vacuum breaker valve means opening through the wall of said stationary joint member beyond said flow control valve means, and means carried by said exterior actuating means adapted to open said vacuum breaker valve means when said actuating means occupies normal initial position disposing said flow control valve means in valve port closing position.

5. In a fluid conduit system, a pair of reversely curved tubular joint members having their outer ends in longitudinal alignment and their opposed inner ends cooperatively engaged and aligned on a transverse axis, one of said members constituting a relatively stationary joint member and the other a relatively movable joint member, said joint members having cooperative offset means for pivotally relating the same whereby the movable joint member may swing about said transverse axis, means to bias said movable joint member to an up-swung normal position, the elbow portion of said stationary joint member being formed to provide a valve casing portion, the axis of which is angular to the aforesaid transverse axis of the joint members, said valve casing including a wall having a valve port across the passage of said stationary joint member, a spring closed flow control valve member to normally close said valve port against the flow of fluid through said joint members, a valve member actuating cam having a spindle journaled in and through the wall of said stationary joint member, and a cam actuating lever arm on the external end of said spindle.

6. In a fluid conduit system, a pair of reversely curved tubular joint members having their outer ends in longitudinal alignment and their opposed inner ends cooperatively engaged and aligned on a transverse axis, one of said members constituting a relatively stationary joint member and the other a relatively movable joint member, said joint members having cooperative offset means for pivotally relating the same whereby the movable joint member may swing about said transverse axis, means to bias said movable joint member to an up-swing normal position, the elbow portion of said stationary joint member being formed to provide a valve casing portion, the axis of which is angular to the aforesaid transverse axis of the joint members, said valve casing including a wall having a valve port across the passage of said stationary joint member, a spring closed flow control valve member to normally close said valve port against the flow of fluid through said joint members, a valve member actuating cam having a spindle journaled in and through the wall of said stationary joint member, a cam actuating lever arm on the external end of said spindle, a vacuum breaker valve means opening through the wall of said stationary joint member beyond said flow control valve member, and means carried by said lever arm adapted to open said vacuum breaker valve means when said lever arm and said cam controlled thereby occupy normal initial positions disposing said flow control valve member in valve port closing position.

7. In an articulated fluid conduit system, a pair of reversely curved tubular joint members having their outer ends in longitudinal alignment and their opposed inner ends cooperatively engaged and aligned on a transverse axis, one of said members constituting a stationary joint member and the other a relatively movable joint member, said joint members having cooperative means for pivotally relating the same whereby the movable joint member may swing about said transverse axis, means to bias said movable joint member to an up-swing normal position, a swivel joint means connected with the outer end of said stationary joint member whereby the swing joint formed by said joint members may, as a whole, be revolved about the longitudinal axis thereof, said stationary joint member having a wall provided with a valve port across its passage, a movable flow control valve means to normally close said valve port against the flow of fluid through said joint members, operating means for said valve means, and means exteriorly of said stationary joint member for actuating said operating means.

8. In an articulated fluid conduit system, a pair of reversely curved tubular joint members having their outer ends in longitudinal alignment and their opposed inner ends' cooperatively engaged and aligned on a transverse axis, one of said members constituting a stationary joint member and the other a relatively movable joint member, said joint members having cooperative means for pivotally relating the same whereby the movable joint member may swing about said transverse axis, means to bias said movable joint member to an up-swung normal position, a swivel joint means connected with the outer end of said stationary joint member whereby the swing joint formed by said joint members may, as a whole, be revolved about the longitudinal axis thereof, said stationary joint member having a wall provided with a valve port across its passage, a movable flow control valve means to normally close said valve port against the flow of fluid through said joint members, operating means for said valve means, means exteriorly of said stationary member for actuating said operating means, a vacuum breaker valve means opening through the wall of said stationary joint member beyond said flow control valve means, and means carried by said exterior actuating means adapted to open said vacuum breaker valve means when said actuating means occupies normal initial position disposing said flow control valve means in valve port closing position.

9. In an articulated fluid conduit system, a pair of reversely curved tubular joint members having their outer ends in longitudinal alignment and their opposed inner ends cooperatively engaged and aligned on a transverse axis, one of said members constituting a stationary joint member and the other a relatively movable joint member, said joint members having cooperative means for pivotally relating the same whereby the movable joint member may swing about said transverse axis, means to bias said movable joint member to an up-swung normal position, a swivel joint means connected with the outer end of said stationary joint member whereby the swing joint formed by said joint members may, as a whole, be revolved about the longitudinal axis thereof, the elbow portion of said stationary joint member being formed to provide a valve casing portion, the axis of which is angular to the aforesaid transverse axis of the joint members, said valve casing including a wall having a valve port across the passage of said stationary joint member, a spring closed flow control valve member to normally close said valve port against the flow of fluid through said joint members, a valve member actuating cam having a spindle journaled in and through the wall of said stationary joint member, a cam actuating lever arm on the external end of said spindle.

10. In an articulated fluid conduit system, a pair of reversely curved tubular joint members having their outer ends in longitudinal alignment and their opposed ends cooperatively engaged and aligned on a transverse axis, one of said members constituting a stationary joint member and the other a relatively movable joint member, said joint members having cooperative means for pivotally relating the same whereby the movable joint member may swing about said transverse axis, means to bias said movable joint member to an up-swung normal position, a swivel joint means connected with the outer end of said stationary joint member whereby the swing joint formed by said joint members may, as a whole, be revolved about the longitudinal axis thereof, the elbow portion of said stationary joint member being formed to provide a valve casing portion, the axis of which is angular to the aforesaid transverse axis of the joint members, said valve casing including a wall having a valve port across the passage of said stationary joint members, a spring closed flow control valve member to normally close said valve port against the flow of fluid through said joint members, a valve member actuating cam having a spindle journaled in and through the wall of said stationary joint member, a cam actuating lever arm on the external end of said spindle, a vacuum breaker valve means opening through the wall of said stationary joint member beyond said flow control valve member, and means carried by said lever arm adapted to open said vacuum breaker valve means when said lever arm and said cam controlled thereby occupy normal initial positions disposing said flow control valve member in valve port closing position.

11. In a fluid conduit system, a pair of elbow shaped tubular joint members having longitudinally extending outer ends and their opposed inner ends cooperatively engaged and aligned on a transverse axis, one of said members constituting a relatively stationary joint member and the other a relatively movable joint member, said joint members having cooperative means for pivotally relating the same whereby the movable joint member may swing about said transverse axis, the elbow portion of one of said joint members being formed to provide a valve casing portion, the axis of which is angular to the aforesaid transverse axis of the joint members, said valve casing including a wall perpendicular to its axis, said wall having a valve port across the passage of said stationary member, a spring closed valve member to normally close said valve port against the flow of fluid through said joint members, a valve member actuating cam having a spindle journaled in and through the wall of said stationary joint member, and a cam actuating lever arm on the external end of said spindle.

HOWARD C. KRONE.
WILLIAM MEYER.